(12) United States Patent
Cook et al.

(10) Patent No.: US 9,494,236 B2
(45) Date of Patent: Nov. 15, 2016

(54) GASKET WITH DISSIMILAR MATERIALS

(71) Applicant: Dana Automotive Systems Group, LLC, Maumee, OH (US)

(72) Inventors: Christopher M. Cook, McKenzie, TN (US); Kelly D. Puckett, Paris, TN (US); Dakota W. Foster, Paris, TN (US); Jason D. Wimberley, Paris, TN (US); Justin R. Knott, McKenzie, TN (US); James W. Hodges, Palmersville, TN (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 14/534,300

(22) Filed: Nov. 6, 2014

(65) Prior Publication Data

US 2016/0131258 A1      May 12, 2016

Related U.S. Application Data

(60) Provisional application No. 61/900,486, filed on Nov. 6, 2013.

(51) Int. Cl.
*F16J 15/02* (2006.01)
*F16J 15/10* (2006.01)
*F02F 11/00* (2006.01)
*F16J 15/06* (2006.01)

(52) U.S. Cl.
CPC .............. *F16J 15/102* (2013.01); *F02F 11/00* (2013.01); *F16J 15/062* (2013.01); *F16J 15/104* (2013.01)

(58) Field of Classification Search
CPC .......... F16J 15/102; F16J 15/104; F16J 15/06; F16J 15/064; F16J 11/02
See application file for complete search history.

(56) References Cited

U.S. PATENT DOCUMENTS

| | | | | |
|---|---|---|---|---|
| 3,720,420 | A | * | 3/1973 | Jelinek .................. F16J 15/104 277/611 |
| 5,011,162 | A | * | 4/1991 | Jelinek ............... F01M 11/0408 277/644 |
| 5,536,018 | A | * | 7/1996 | Szott ...................... F16J 15/104 277/313 |
| 5,700,017 | A | * | 12/1997 | Tensor ................... F16J 15/123 277/596 |
| 6,173,969 | B1 | * | 1/2001 | Stoll ..................... F16J 15/061 277/630 |

(Continued)

FOREIGN PATENT DOCUMENTS

EP       1302707 A2      4/2003
FR       2863677 A1      6/2005

(Continued)

*Primary Examiner* — Kristina Fulton
*Assistant Examiner* — Eugene G Byrd
(74) *Attorney, Agent, or Firm* — Marshall & Melhorn, LLC

(57) ABSTRACT

A gasket is provided with two dissimilar materials. The two different materials are used to provide different sealing characteristics. In one embodiment, the different sealing materials join to create the same or a similar profile to the profile of the individual materials. In another embodiment, the different sealing materials have the same profile but have joining portions that are complementary to one another where the two materials are joined to one another.

16 Claims, 6 Drawing Sheets

(56) References Cited

U.S. PATENT DOCUMENTS

| | | |
|---|---|---|
| 6,609,717 B2 | 8/2003 | Hinson |
| 6,730,385 B1 * | 5/2004 | Tanaka .................. B32B 25/04 |
| | | 156/326 |
| 7,029,013 B2 | 4/2006 | Yajima et al. |
| 2004/0239047 A1 * | 12/2004 | Kent ...................... F16J 15/064 |
| | | 277/628 |
| 2007/0210528 A1 * | 9/2007 | Baber .................... F16J 15/104 |
| | | 277/549 |
| 2008/0226862 A1 | 9/2008 | Spurrell |
| 2010/0018778 A1 * | 1/2010 | Nanayakkara .......... C08L 21/00 |
| | | 175/371 |
| 2011/0227295 A1 * | 9/2011 | Watanabe .............. F02F 11/002 |
| | | 277/591 |

FOREIGN PATENT DOCUMENTS

| | | | |
|---|---|---|---|
| WO | 2007024212 A1 | 3/2007 | |
| WO | WO 2007024212 A1 * | 3/2007 | .......... B29C 43/027 |
| WO | 2011114800 A1 | 9/2011 | |
| WO | 2013143721 A1 | 10/2013 | |

* cited by examiner

GASKET WITH DISSIMILAR MATERIALS

RELATED APPLICATIONS

This application claims the benefit of U.S. Provisional Patent Application Ser. No. 61/900,486 filed on Nov. 6, 2013, which is incorporated by reference herein.

FIELD OF THE INVENTION

The present invention relates to a gasket with dissimilar materials. More particularly, the invention relates to a gasket having dissimilar materials at different sealing locations.

BACKGROUND OF THE INVENTION

Gaskets are well-known devices for creating a seal between two parts. In some instances, one kind of gasket material is preferable over another material for certain applications. The preference for one material over another might be because of the performance characteristics of the gasket material. In some cases, the higher performing gasket material is more expensive. The resulting gasket is often entirely constructed of the more expensive, higher performing material.

This is disadvantageous because the expensive material might be used in certain locations or applications that does not call for higher performing gasket material. It would be preferable to only selectively use the higher performing, more expensive gasket material only where it is needed in an application and then use a less expensive material where the higher performing material is not needed.

It would also be advantageous to selectively use two different gasket materials for a sealing application and join those materials to one another without having to make accommodations in the mating parts for the joint.

SUMMARY

In a first embodiment, a gasket comprises two dissimilar materials. The first material has a first and second profile, which are different from one another, and the second material has a first and a second profile, which are different from one another. The first material first profile and the second material first profile are the same. The first material second profile and the second material second profile combine to form the same shape as the first material first profile or the second material first profile.

In a second embodiment, the two dissimilar materials are provided with complementary joining portions. The first material joining portion uses a series of planes with a male portion extending from two of the planes. The second material joining portion uses a series of complementary planes with a recess between two planes for receiving the male portion.

BRIEF DESCRIPTION OF THE DRAWINGS

The inventions will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
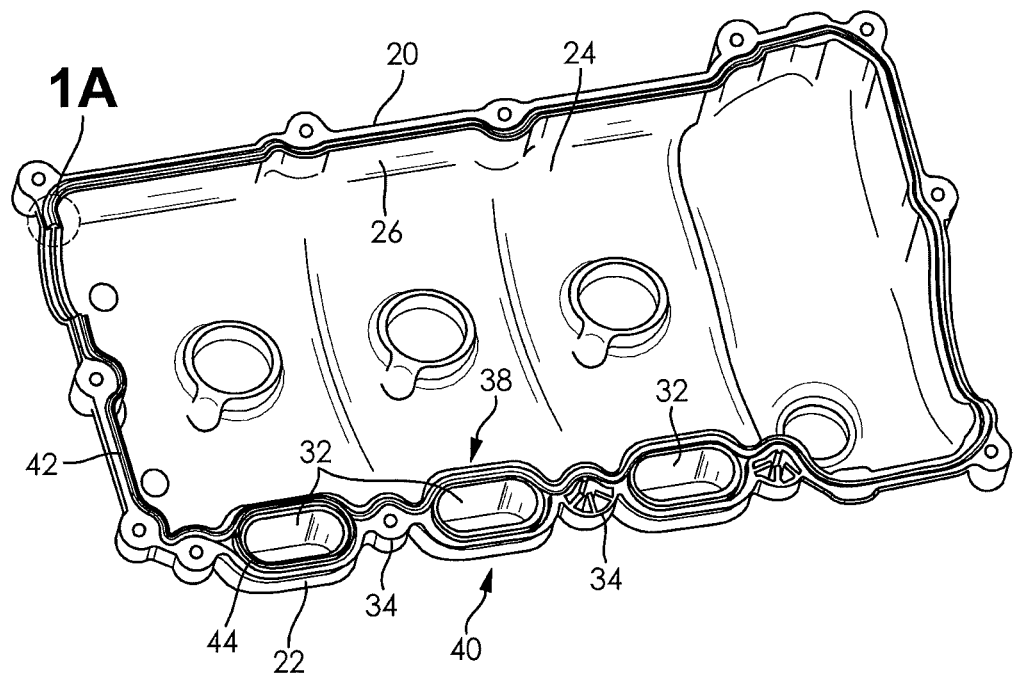
FIG. 1 is a schematic, perspective view of an air intake and a cam cover for a vehicle utilizing two dissimilar gasket materials.

Turning now to FIG. 1, one embodiment of the invention is depicted. In FIG. 1, a cam cover 20 with an integrated air intake 22 is depicted. Those skilled in the art know that these can be separate pieces, or they can be one piece and integrally formed like that shown in FIG. 1. It is also important to appreciate that the cam cover 20 and air intake 22 merely provide one environment for the device described below and the device is not limited to use with just a cam cover 20 and/or an air intake 22.

Figure 2:
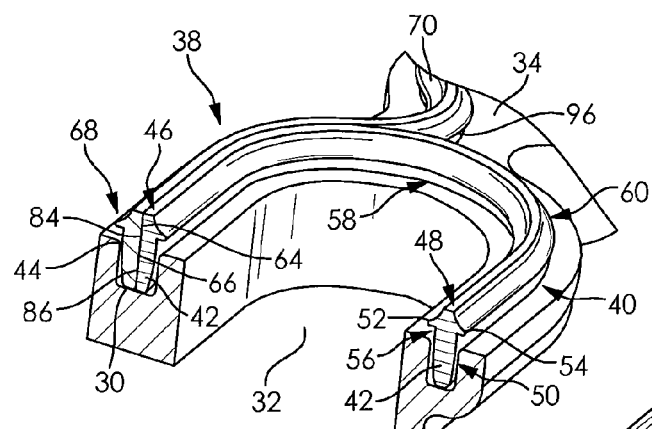
FIG. 2 is a schematic, perspective view of a cutaway portion of FIG. 1.

As seen in FIGS. 1 and 2, the cam cover 20 has an interior portion 24 bounded by an upstanding perimeter wall 26. An upper surface 28 of the wall 26 has a continuous groove 30 located therein. A gasket, or seal, is located within the groove 30 to seal the cam cover 20.

The air intake 22 portion forms a part of the perimeter wall 26. In this instance, the air intake portion 22 defines three openings 32, each opening 32 is separated by a land 34. The openings 32 are bounded by continuous walls 36.

Figure 3:
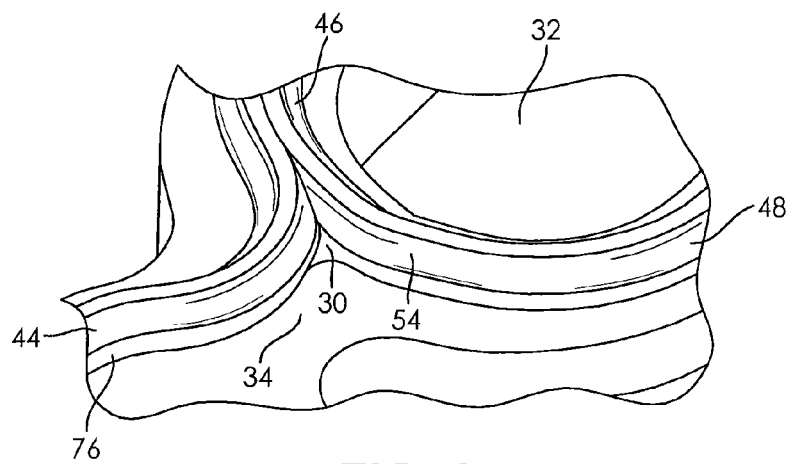
FIG. 3 is a schematic, perspective view of a detail of FIG. 1.

As can be appreciated from FIGS. 1, 2 and 3, the perimeter groove 30 splits at each opening 32. A first part 38 of the perimeter groove 30 extends around one side of an opening 32 and a second part 40 of the perimeter groove 30 extends around the other side. In the depicted embodiment, the first part 38 extends inwardly into the cam cover interior portion 24, and the second part 40 extends outwardly or away from the cam cover interior portion 24. The two groove parts 38, 40 come back together adjacent the land 34, extend as one through the land 34 and then split again at the next opening 32.

The air intake openings 32 and the cam cover 20 need to be sealed so a gasket, or seal, is located about the openings 32. Preferably, the air intake openings 32 are sealed with a first material 42 and the cam cover 20 is sealed with a second, different material 44.

The first material 42 that is used about the air intake openings 32 may be such as FKM or FPM. FPM is the international abbreviation according to DIN/ISO, whereas FKM is the short form for the fluoroelastomer category according to the American standard ASTM.

Other fluorinated elastomers are perfluoro-elastomers (FFKM) and tetrafluoro ethylene/propylene rubbers (FEPM). All FKMs contain vinylidene fluoride as a monomer. Fluoroelastomers are more expensive than neoprene or nitrile rubber elastomers. They provide additional heat and chemical resistance. FKMs can be divided into different classes on the basis of their chemical composition, their fluorine content or their crosslinking mechanism.

The second material 44 that is used about the cam cover 20 may be such as AEM or ACM. AEM rubber, also abbreviated AECM (ISO 1629), is an ethylene acrylic rubber. ACM is acrylic rubber, known by the chemical name alkyl acrylate copolymer.

It is a type of rubber that has good resistance to hot oil, ozone and oxidation and it has a low permeability to gases. It has a high continuous working temperature in the range of 300 degrees F.

FIG. 1 depicts a portion of the first material 42 extending about one of the air intake openings 32 and a portion of the second material 44 extending about the cam cover 20. The first material 42 extends continuously, without breaks or interruption about the air intake opening 32. Similarly, the second material 44 extends continuously, without breaks or interruption about the cam cover 20.

It is desirable to use the first material 42 about the air intake openings 32 because of its performance characteristics. The first material 42 can be expensive and thus it is undesirable to extend it about the cam cover 20. Instead, it is preferred to use the second material 44 about the cam cover 20 since it is less expensive and it has performance characteristics adequate for the conditions therein.

There is, however, only a single groove 30 extending about the air intake openings 32 and the cam cover 20; the groove 30 has a single, mostly, if not entirely, constant width along its entire course. In order to accommodate two different materials 42, 44 within the groove 30 the gaskets depicted and described herein may be used.

As can be appreciated from FIG. 2, the first material 42 that extends about the air intake openings 32 has a first profile 46 that extends about the first part 38 of the groove 30 about an air intake opening 32 and a second profile 48 that extends about the second part 40 of the groove 30 about the air intake opening 32. The first profile 46 is located adjacent the second material 44. The first material 42 in both profiles 46, 48 is the same and both profiles 46, 48 are integrally connected.

The second profile 48 has a generally T-shaped cross section as seen in FIG. 2. The cross-section comprises a base portion 50 with an inner arm 52 and an outer arm 54 extending from an upper portion 56 of the base portion 50. The inner arm 52 extends along an inner perimeter 58 of the first material 42 and the outer arm 54 extends along an outer perimeter 60 of the first material 42. The arms 52, 54 are located across from one another on the base portion 50 and extend generally transversely from the base portion 50. The arms 52, 54 taper upwardly to form an upper track 62 on the second profile 48.

Figure 4:
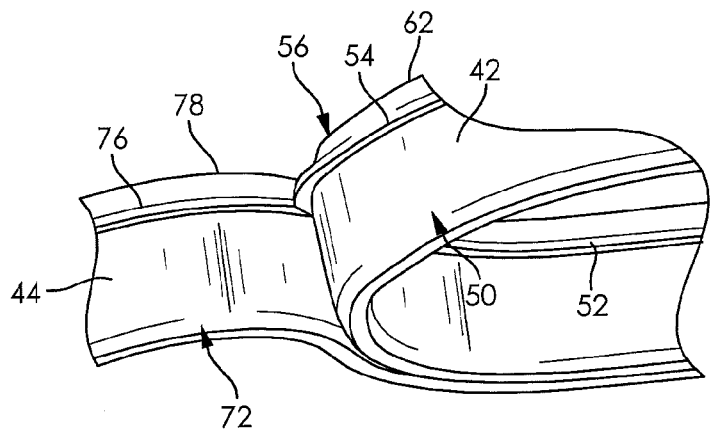
FIG. 4 is also a schematic, perspective view of a cutaway detail of FIG. 1.

At a land 34, the second profile 48 of the first material 42 transitions to the first profile 46, as seen in FIGS. 3 and 4. More particularly, the outer arm 54 tapers out of existence into the base portion 50. Additionally, the material from an inside edge 64 of the upper track 62 and extending vertically downward is removed from the first profile 46. The removed material results in a planar side 66, as shown in FIG. 2. The first profile 46 thus comprises the upper track 62, the inner arm 52 and a portion, such as approximately half, of the base portion 50.

Figure 1A:
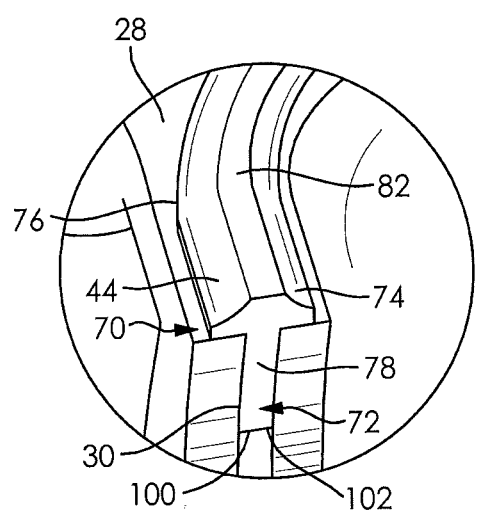
FIG. 1A is a detail of a feature from FIG. 1.

The second material 44 has a first and second profile 68, 70 as well, as shown in FIG. 2. The second profile 70 is the same as the second profile 48 for the first material 42. Namely, the second material second profile 70 comprises a generally T-shaped cross section, as shown in FIG. 1A. The cross-section comprises a base portion 72 with an inner arm 74 and an outer arm 76 extending from an upper portion 78 of the base portion 72. The arms 74, 76 are located across from one another on the base portion 72 and extend generally transversely from the base portion 72. The arms 74, 76 taper upwardly to form an upper track 82 on the second profile 70. The second material 44 in both profiles 68, 70 is the same and both profiles 68, 70 are integrally connected.

At a land portion 34, the second profile 70 of the second material 44 transitions to the first profile 68, which can be appreciated from FIGS. 2-4. More particularly, the outer arm 76 tapers out of existence into the base portion 72. Additionally, the material from an outside edge 84 of the upper track 82 and extending vertically downward through the base portion 72 is removed from the first profile 68. The removed material results in a planar side 86. The first profile 68 thus comprises the upper track 82, the outer arm 76 and a portion, such as approximately half, of the base portion 72.

The planar sides 66, 86 of the first material 42 and the second material 44 abut one another in a continuous fashion from the upper tracks 62, 82 and along the base portions 50, 72 of the materials. The planar sides 66, 86 abut one another in a continuous fashion at least along their length in the groove 30 from one land 34 to the next land 34.

In one embodiment, the two second profiles 48, 70 of the two different gasket materials 42, 44 combine to result in a single profile that is the same as the two first profiles 46, 68. In other words, the two second profile 48, 70, when located together, fit within the same single groove 30 as the first profiles 46, 68, and have the same general shape. This can be appreciated from FIG. 2.

It is also within the scope of the present invention that the groove 30 be slightly wider where the two materials 42, 44 combine in order to accommodate them, which can be seen in FIG. 3. It is also within the scope of the present invention that the two materials 42, 44 can combine to create different shapes than the two first profiles 46, 68 put together.

Figure 2A:
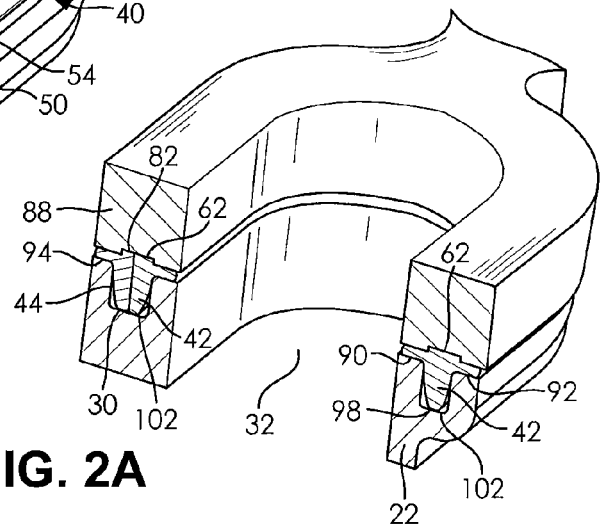
FIG. 2A is a schematic, perspective view of a cutaway portion of FIG. 1 with a mating part.

A mating part 88, or parts, is located against the air intake 22 and cam cover 20 to enclose them, as shown in FIG. 2A. For convenience, only a single mating part 88 will be referred to in the following description.

The mating part 88 is located in direct contact with the upper track 62 of the first material 42 as it extends around the periphery of the air intake 22, which can be appreciated in FIG. 2A. The mating part is also located in direct contact with the upper track 82 of the second material 44 about the periphery of the cam cover 20. Similarly, the mating part 88 is located in direct contact with the upper tracks 62, 82 of the first and second materials 42, 44 when they are located adjacent one another in the groove 30, such as in the first part 38 of the groove, which can be appreciated in FIG. 2A.

In each of the above-described locations, the mating part 88 compresses the first and second materials 42, 44 so that a seal is created between the materials 42, 44 and the mating part 88. More particularly, a seal is formed between the upper tracks 62, 82 and the mating part 88, as seen in FIG. 2A.

Compression also results in a seal being formed between an underside surface 90, 92, 94, 96 of each inner and outer arm 52, 54, 74, 76 of the first and second materials 42, 44 and the upper surface 28 of the wall 26 defining the groove 30. Additionally, a bottom surface 98, 100 of each base portion 50, 72 is located in direct contact with a bottom surface 102 of the groove 30 to form a seal.

Figure 5:
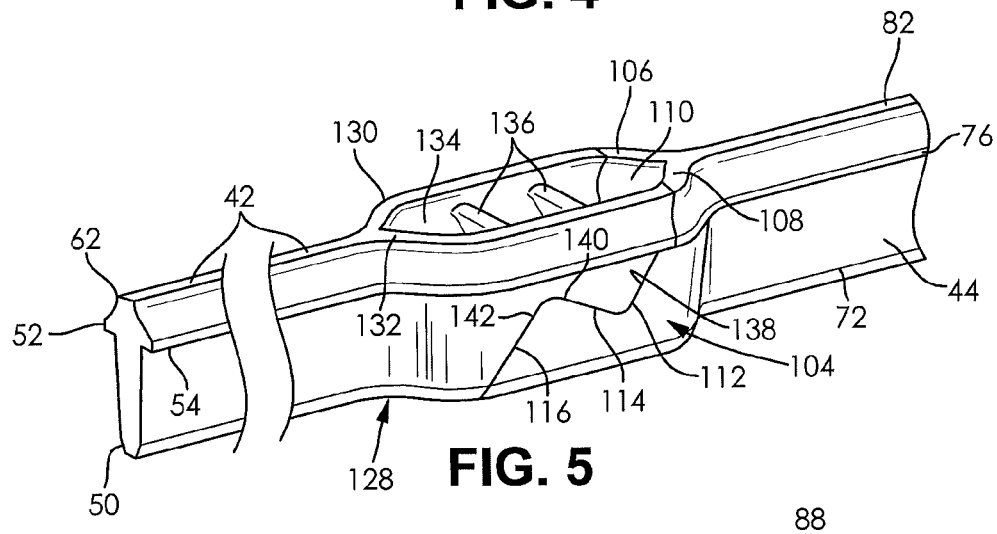
FIG. 5 is a schematic, perspective view of another embodiment of two joined dissimilar materials.
Figure 6:
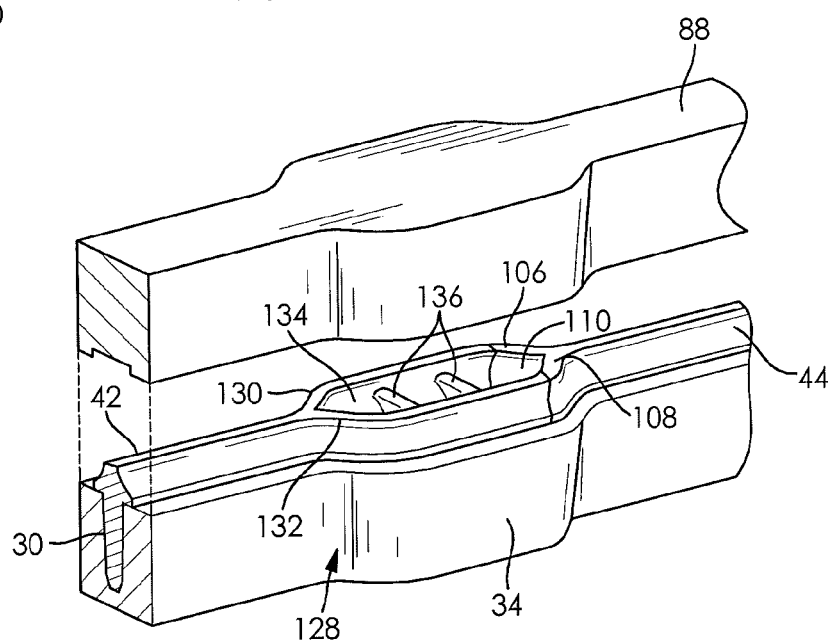
FIG. 6 is a schematic, perspective view of the materials in a channel with a mating part.
Figure 7:
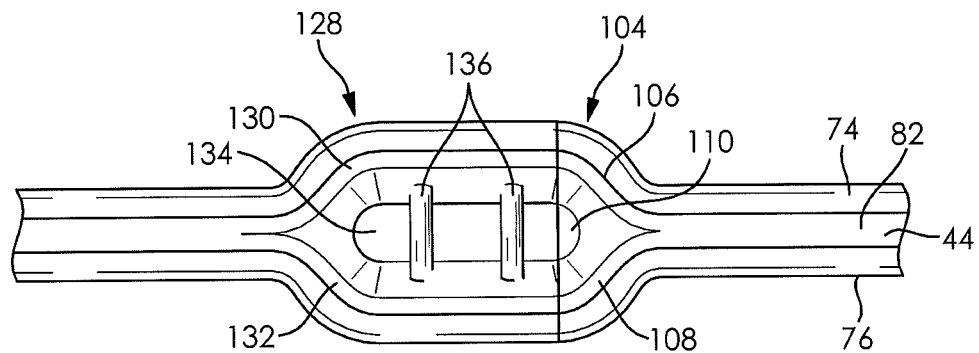
FIG. 7 is a schematic, top view of the embodiment depicted in FIG. 5.

FIGS. 5-11 depict yet another embodiment of a gasket comprised of two dissimilar materials. This gasket may be used in the application as described above, such as for providing sealing between an integrated cam cover 20 and air intake 22 and a mating part 88, as shown in FIG. 6 and appreciated from FIGS. 1 and 2A. The gasket is preferably located in the groove 30 as described above. It should be understood, however, that the gasket can be used in any application and it not restricted to the parts or the particular groove as depicted and described herein.

The gasket is comprised of the first material 42 and the second material 44, as described above. Preferably, the second material 44 extends around the cam cover 20 perimeter. It is desirable to use the first material 42 about the air intake 22 openings 32.

The second material 44 extends to the land area 34 where a joining portion 104 for connecting with the first material 42 is located. In the depicted embodiment, prior to the land area 34, the second material 44 has the same shape and features as described above. Namely, the second material 44 has an upper track 82, inner and outer arms 74,76 and base portion 72. In, or adjacent, the land area 34, the second material 44 widens to form the joining portion 104, as seen in FIGS. 5, 6, 7, 8 and 9. More particularly, the upper track 82 splits into a first track 106 and a second track 108. The two tracks 106, 108 initially diverge from one another. The tracks 106, 108 are separated from one another by a first recess 110. The inner arm 74 and the outer arm 76 diverge from one another on their respective tracks 106, 108.

Figure 8:
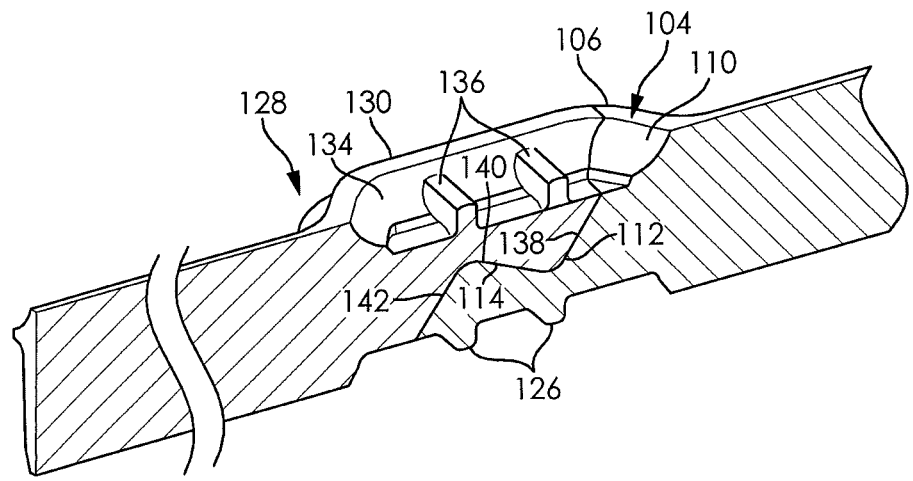
FIG. 8 is a schematic, perspective view in cutaway of the embodiment depicted in FIG. 5.
Figure 10:
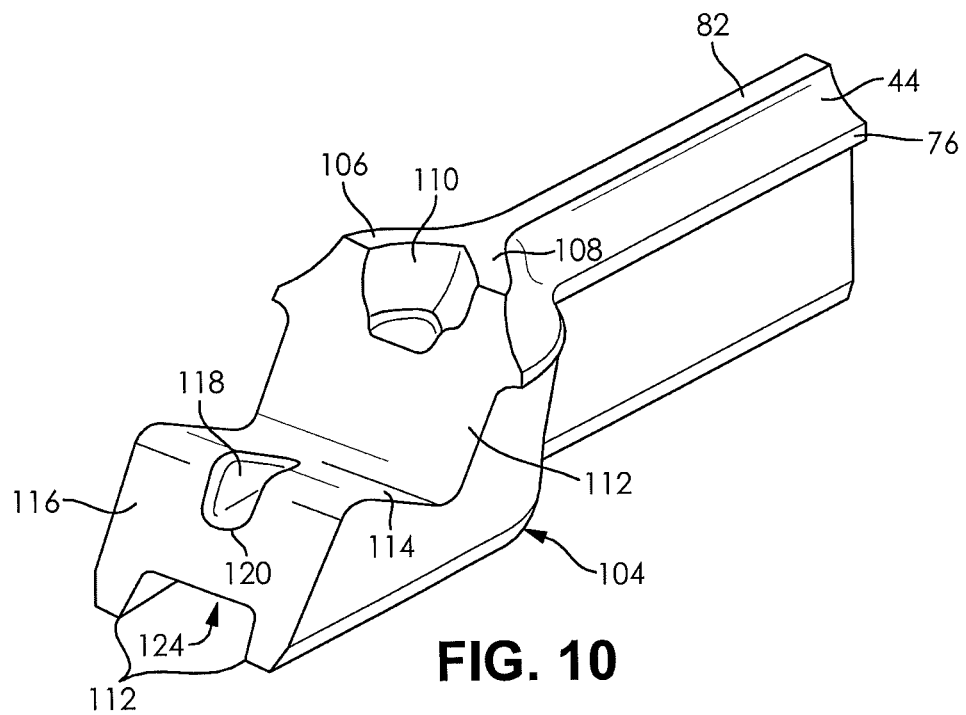
FIG. 10 is a schematic, perspective view of one part of the gasket depicted in FIG. 5.
Figure 11:
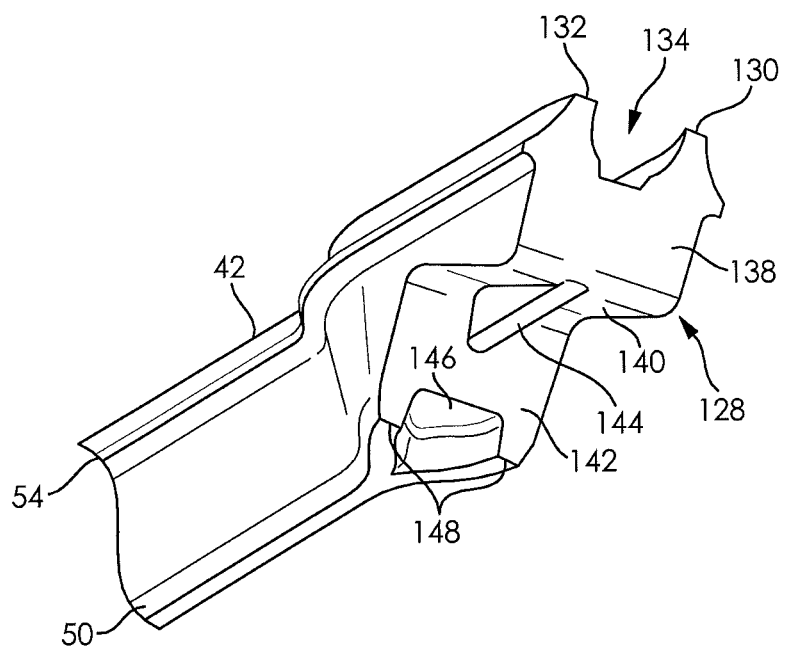
FIG. 11 is a schematic, perspective view of a second part of the gasket depicted in FIG. 5.
Figure 12:
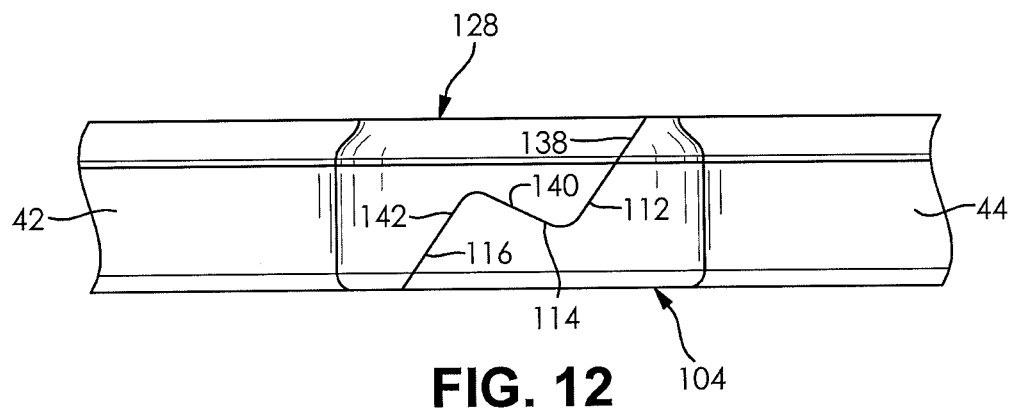
FIG. 12 is a schematic, side view of the parts in FIGS. 10 and 11.

As seen in FIGS. 8 and 10, a first downwardly extending plane 112 interrupts the first recess 110 and both tracks 106, 108. The first plane 112 transitions to a second plane 114. The second plane 114 has an upward angle associated with it. The second plane 114 transitions to a third plane 116, where the third plane 116 extends downwardly. The transitions may occur between ⅓ and ⅔ the gasket thickness.

The transitions between planes in the figures are depicted as having radii, but it is permissible to have radii other than as shown, or the transitions may be at sharp angles with respect to one another.

As best seen in FIG. 10, a second recess 118 is located in the second plane 114 and extends through to the third plane 116. A base 120 of the second recess 118 is parallel with the upper track 82. The second recess 118 is generally centered in the second 114 and third 116 planes.

Figure 9:
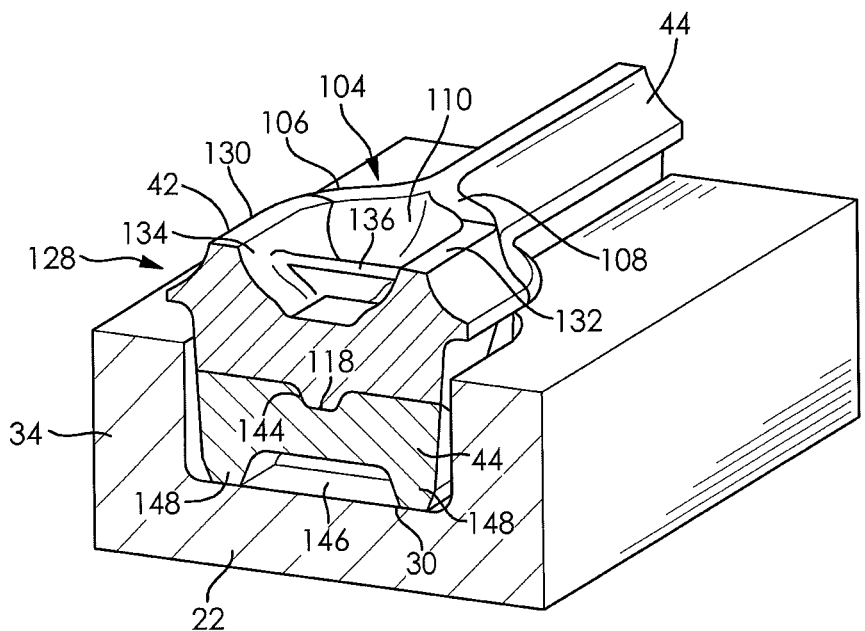
FIG. 9 is a schematic, perspective view in cutaway of the embodiment depicted in FIG. 5 located in a cam cover.

Two feet 122 extend downwardly from beneath the joining portion 104, as shown in FIG. 9. The feet 122 are separated by a third recess 124. Cross-pieces 126 extend transverse to the feet 122 across the third recess 124. The cross-pieces 126 are shown in FIG. 8. The cross-pieces 126 may be the same height as the feet 122 or they may be a lesser dimension. The cross-pieces 126 add strength to the feet 122 and prevent them from buckling inwardly.

Preferably, the entirety of the second material 44 is one-piece, integrally formed and unitary. It is within the scope of the invention, however, for any of the above-described features of the gasket to be separately formed and then joined together.

The first material 42 has a complementary shaped joining portion 128 to the second material 44 joining portion 104, which can be appreciated from at least FIGS. 5, 8 10, 11 and 12. The first material 42 approaches the joining portion 128 with a profile as described above. Namely, the first material 42 has an upper track 62, inner and outer arms 52, 54 and a base portion 50.

In or adjacent the land area 34, the first material 42 widens to form the joining portion 128, as shown in FIGS. 5, 6, 7 and 10. More particularly, the upper track 62 splits into a first track 130 and a second track 132, as shown in FIGS. 5 and 6. The two tracks 130, 132 diverge from one another. The tracks 130, 132 are separated from one another by a first recess 134. The inner arm 52 and the outer arm 54 diverge from one another on their respective tracks 130, 132.

At least one, and preferably two, cross-pieces 136 extend across the first recess 134. The cross-pieces 136 extend from the diverged tracks 130, 132 continuously across the first recess 134 equidistant from one another. The cross-pieces 136 are substantially transverse to the diverged tracks 130, 132. The cross-pieces 136 may be the same height as the tracks 130, 132 or they may be a lesser dimension, as shown in FIG. 8. The cross-pieces 136 add strength to the tracks 130, 132 and prevent them from buckling inwardly.

A first downwardly extending plane 138 interrupts the first recess 134 and both tracks 130, 132, as shown in FIGS. 8, 10, 11 and 12. The first plane 138 transitions to a second plane 140. The second plane 140 has an upward angle associated with it. The second plane 140 transitions to a third plane 142, where the third plane 142 extends downwardly. The transitions may occur between ⅓ and ⅔ the gasket thickness.

The transitions between planes in the figures are depicted as having radii, but it is permissible to have radii other than as shown, or the transitions may be at sharp angles with respect to one another.

A male portion 144 is located in the second plane 140 and extends through to the third plane 142, as shown in FIG. 10. The male portion 144 is axially aligned with the base portion 50 of the first material 46. The male portion 144 has a complementary shape and location to the second recess 118 in the second material 44. The male portion 144 fits within the second recess 118 to help secure the two materials 42, 44 together.

A second recess 146 in the first material 42 extends into the third plane, as shown in FIG. 10. The second recess 146 results in two downwardly extending feet 148 being formed in the first material 42, best seen in FIGS. 10 and 11. The two feet 148 are formed in a unitary fashion with the base portion 50 of the first material 46. The two feet 148 match in size, shape and are aligned with the two feet 122 in the second material 44.

Preferably, the entirety of the first material 42 is one-piece, integrally formed and unitary. It is within the scope of the invention, however, for any of the above-described features of the first material 42 to be separately formed and then joined together.

The plane shapes 112, 138, 114, 140, 116, 142 of the first material 42 and the second material 44 increase the surface area of the materials 42, 44 at the joining portions 104, 128. The increased surface area, the resulting zig-zag shape of the joining portions 104, 128, and the male portion 144 and mating recess 118, result in a stable, firm joint that forms a tight and strong seal between the two materials 42, 44. The zig-zag shape created by the planes has the added benefit of permitting the materials 42, 44 to compress against one another for better sealing.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A gasket, comprising:
   a first material and a second material different from the first material, wherein the first material has a first profile and a second profile and the second material has a first profile and a second profile,
   wherein the second profile of the first material comprises a base portion, an inner arm defining an inner perimeter, an outer arm defining an outer perimeter and an upper track,
   wherein the first profile of the first material comprises a planar side in place of said outer arm,
   wherein the first material in the first profile and the second profile are the same and both profiles are integrally connected to one another,
   wherein the second profile of the second material comprises a base portion, an inner arm defining an inner perimeter, an outer arm defining an outer perimeter and an upper track,
   wherein the first profile of the second material comprises a planar side in place of said outer arm,
   wherein the second material in the first profile and the second profile are the same and both profiles are integrally connected to one another,
   wherein said planar side of said first material first profile directly contacts said planar side of said second material first profile.

2. The gasket of claim 1, wherein said first material second profile and said second material second profile are the same as said first material first profile in direct contact with said second material first profile.

3. The gasket of claim 1, wherein the first material first profile and the second material first profile are mirror images of one another.

4. The gasket of claim 1, wherein said outer arm of said first material tapers out of existence into said first material base portion.

5. The gasket of claim 3, wherein said outer arm of said second material tapers out of existence into said second material base portion.

6. The gasket of claim 4, wherein said first material taper and said second material taper have a complementary shape to one another.

7. The gasket of claim 1, wherein said first material is continuous, unitary and integrally formed.

8. The gasket of claim 1, wherein said second material is continuous, unitary and integrally formed.

9. The gasket of claim 1, wherein said second material first profile is located in an air intake opening channel and said second material second profile is located in a cam cover channel.

10. The gasket of claim 9, wherein said air intake opening channel merges with said cam cover channel and said first material first profile and said second material first profile are located in said merged channel.

11. A gasket, comprising:
    a first material and a second material different from the first material,
    wherein the first material has a joining portion and the second material has a joining portion complementary to the first material joining portion,
    wherein the first material joining portion divides an upper track into a first track and a second track, said tracks separated by a recess containing at least one crosspiece connecting the said tracks,
    wherein the second material joining portion divides an upper track into a first track and a second track, said tracks separated by a first recess,
    wherein the first material joining portion comprises three planes wherein a male portion extends between the second and third planes,
    wherein the second material joining portion comprises three planes complementary to said three planes of said first material joining portion wherein a recess is located between the second and third planes for receiving said male portion therein.

12. The gasket of claim 11, wherein the first material and said second material have the same profiles outside of said joining portions.

13. The gasket of claim 12, wherein said profiles for said first material and said second material both comprise base portions, inner and outer arms extending transversely from upper portions of said base portions and upper tracks.

14. The gasket of claim 11, wherein said second material has a second recess bounded by feet wherein at least one crosspiece extends across said recess to connect said feet.

15. The gasket of claim 11, wherein a first material first plane extends downwardly, a first material second plane extends upwardly and inwardly into the first material and a first material third plane extends downwardly.

16. The gasket of claim 11 wherein a second material first plane extends downwardly and inwardly into the second material, a second material second plane extends upwardly and a second material third plane extends downwardly.

* * * * *